United States Patent
Kuromizu

(10) Patent No.: US 10,191,208 B2
(45) Date of Patent: Jan. 29, 2019

(54) LIGHT SOURCE DEVICE AND DISPLAY APPARATUS

(71) Applicant: Sakai Display Products Corporation, Sakai-shi, Osaka (JP)

(72) Inventor: Yasumori Kuromizu, Sakai (JP)

(73) Assignee: Sakai Display Products Corporation, Sakai-shi, Osaka (JP)

(*) Notice: Subject to any disclaimer, the term of this patent is extended or adjusted under 35 U.S.C. 154(b) by 238 days.

(21) Appl. No.: 14/905,214

(22) PCT Filed: Jul. 18, 2013

(86) PCT No.: PCT/JP2013/069514
§ 371 (c)(1),
(2) Date: Mar. 15, 2016

(87) PCT Pub. No.: WO2015/008362
PCT Pub. Date: Jan. 22, 2015

(65) Prior Publication Data
US 2016/0195672 A1 Jul. 7, 2016

(51) Int. Cl.
*F21V 7/04* (2006.01)
*F21V 8/00* (2006.01)

(52) U.S. Cl.
CPC ......... G02B 6/0088 (2013.01); G02B 6/0055 (2013.01); *G02F 2201/46* (2013.01); *G02F 2201/54* (2013.01)

(58) Field of Classification Search
CPC .. G02B 6/0088; G02B 6/0055; G02B 6/0086; G02B 6/0095; G02F 2201/46; G02F 2201/54; G02F 1/133308; G02F 2001/133317; G02F 2001/133322
USPC ................. 362/615, 623, 97.4; 349/60, 58
See application file for complete search history.

(56) References Cited

U.S. PATENT DOCUMENTS

| | | | |
|---|---|---|---|
| 2001/0024248 A1* | 9/2001 | Kim | G02F 1/133308 349/58 |
| 2003/0223020 A1* | 12/2003 | Lee | G02B 6/0088 349/58 |
| 2007/0019419 A1* | 1/2007 | Hafuka | G02F 1/133603 362/373 |
| 2008/0186430 A1* | 8/2008 | Seo | G02B 6/0088 349/65 |

(Continued)

FOREIGN PATENT DOCUMENTS

| | | |
|---|---|---|
| JP | 2002-311430 A | 10/2002 |
| JP | 2011-119218 A | 6/2011 |

*Primary Examiner* — Bryon T Gyllstrom
*Assistant Examiner* — James Endo
(74) *Attorney, Agent, or Firm* — Bret E. Field; Bozicevic, Field & Francis LLP

(57) ABSTRACT

A light source device which includes a reflection sheet suspended by protrusions which penetrate plural places of an outer peripheral edge part of the reflection sheet, and a light guide plate disposed to face the reflection sheet is provided. And the light guide plate has notches formed at positions corresponding to the protrusions of an edge part corresponding to the outer peripheral edge part of the reflection sheet. The light guide plate is provided with being extended using the notches to extend an image display region. The reflection sheet near the notches of the light guide plate reflects the light irregularly reflected near the notches to a light emitting surface side of the light guide plate.

20 Claims, 6 Drawing Sheets

(56) References Cited

U.S. PATENT DOCUMENTS

| | | | | |
|---|---|---|---|---|
| 2008/0252819 A1* | 10/2008 | Hung | ............... | G02F 1/133615 349/65 |
| 2010/0165253 A1* | 7/2010 | Jung | .................... | G02B 6/0088 349/65 |
| 2011/0109844 A1* | 5/2011 | Go | .................... | G02F 1/133308 349/65 |
| 2011/0128756 A1* | 6/2011 | Cho | .................... | G02B 6/0068 362/606 |
| 2011/0261586 A1* | 10/2011 | Kwisthout | ........... | G02B 6/0055 362/607 |
| 2012/0013527 A1* | 1/2012 | Cao | .................... | G02F 1/133615 345/102 |
| 2012/0092890 A1* | 4/2012 | Matsui | ................. | G02B 6/0091 362/607 |
| 2012/0230016 A1* | 9/2012 | Hashino | ............... | G02B 6/0088 362/97.1 |
| 2012/0287672 A1* | 11/2012 | Lee | .................... | G02F 1/133608 362/609 |
| 2013/0051077 A1 | 2/2013 | Cho et al. | | |

\* cited by examiner

LIGHT SOURCE DEVICE AND DISPLAY APPARATUS

This application is the national phase under 35 U.S.C. § 371 of PCT International Application No. PCT/JP2013/069514 which has an International filing date of Jul. 18, 2013 and designated the United States of America.

BACKGROUND

1. Technical Field

The present invention relates to a light source device which includes a reflection sheet suspended by protrusion members which penetrate plural places of one edge part of the reflection sheet, and a light guide plate disposed to face the reflection sheet, and a display apparatus including the light source device.

2. Description of Related Art

Recently, a display apparatus such as a liquid crystal television has been widely distributed. Such a display apparatus includes a light guide plate and a reflection sheet disposed to face the light guide plate.

For example, Japanese Patent Laid-open Publication No. 2002-311430 discloses a liquid crystal display apparatus including a diffusion sheet, a lens sheet, and a diffusion sheet which are disposed on a side opposite to a light emitting surface of a light guide plate to face the light guide plate, protrusion parts formed on edges of the sheets, a reflection sheet disposed on a side surface of the light guide plate so as to protrude from the side surface, and opening parts provided in portions of the reflection sheet protruding therefrom, wherein the protrusion parts of the diffusion sheet, the lens sheet, and the diffusion sheet are locked into the opening parts.

SUMMARY

Meanwhile, among the display apparatuses, the display apparatus having a structure for suspending the light guide plate or the reflection sheet requires a hanging mechanism (for example, a pin member or the like) for suspending.

Therefore, in the display apparatus having such a structure, the hanging mechanism is to be an obstacle, such that it is difficult to provide the light guide plate by extending the same to a position of the hanging mechanism.

In addition, when an image display region extends so that a position relating to the hanging mechanism is included in the image display region in an image display screen, while the light guide plate does not extend to the position of the hanging mechanism, a problem (luminance unevenness) occurs at a portion corresponding to the hanging mechanism in the image display region due to the presence of the hanging mechanism, and thereby provides an abnormal feeling to a user.

However, the liquid crystal display apparatus of Japanese Patent Laid-open Publication No. 2002-311430 does not have the structure for suspending the light guide plate or the reflection sheet, and ingenuity regarding the above-described problem has not been conducted, such that it is not possible to cope therewith.

In consideration of the above-mentioned circumstances, it is an object of the present invention to provide a light source device which includes a reflection sheet suspended by pin-shaped members which penetrate plural places of one edge part of the reflection sheet, and a light guide plate disposed to face the reflection sheet, wherein the light guide plate has notches at positions matching with the pin-shaped members of an edge part corresponding to the one edge part of the reflection sheet, such that it is possible to solve the above-described problem that the light guide plate may not be provided by extending the same due to the hanging mechanism being disturbed, to extend the image display region, and the reflection sheet near the notches of the light guide plate reflects the light irregularly reflected near the notches to a light emitting surface side of the light guide plate, and thereby it is possible to suppress an occurrence of luminance unevenness in a portion corresponding to the hanging mechanism of the image display region, and a display apparatus including the light source device.

According to one aspect of the present invention, there is provided a light source device which includes a reflection sheet suspended by protrusions which penetrate plural places of an outer peripheral edge part of the reflection sheet, and a light guide plate disposed to face the reflection sheet, wherein the light guide plate has notches formed in an edge part corresponding to the outer peripheral edge part of the reflection sheet, and at positions corresponding to the protrusions.

In the present invention, the light guide plate is provided with being extended using the notches of the light guide plate, such that the image display region may be extended. In addition, the reflection sheet near the notches of the light guide plate reflects the light irregularly reflected near the side surface of the light guide plate relating to the notches to a light emitting surface side of the light guide plate, such that an occurrence of luminance unevenness may be suppressed.

According to one aspect of the present invention, there is provided a light source device which includes a reflection sheet having concaves and convexes at plural places of an outer peripheral edge part, and a light guide plate disposed to face the reflection sheet, wherein the light guide plate has notches in an edge part corresponding to the outer peripheral edge part of the reflection sheet, and at positions corresponding to the convex parts.

In the present invention, the light guide plate is provided with being extended using the notches of the light guide plate, such that the image display region may be extended. In addition, the reflection sheet near the notches of the light guide plate reflects the light irregularly reflected near the side surface of the light guide plate relating to the notches to the light emitting surface side of the light guide plate, such that an occurrence of luminance unevenness may be suppressed.

According to one aspect of the present invention, there is provided a display apparatus comprising: the light source device according to the above-described invention; and a display panel which is provided on one surface side of the light guide plate, and displays an image thereon using light made incident thereon through the light guide plate.

In the present invention, the display panel displays a prescribed image using the light which is emitted from the one surface of the light guide plate of the light source device and is made incident on the display panel.

According to the invention, it is possible to solve the problem that the light guide plate may not be provided by extending the same due to the hanging mechanism being disturbed, to extend the image display region, and the reflection sheet near the notches of the light guide plate reflects the light irregularly reflected near the side surface of the light guide plate relating to the notches to the light emitting surface side of the light guide plate, thereby it is possible to suppress an occurrence of luminance unevenness in the portion corresponding to the hanging mechanism of the image display region.

The above and further objects and features will move fully be apparent from the following detailed description with accompanying drawings.

DETAILED DESCRIPTION

Hereinafter, a case in which a light source device and a display apparatus according to embodiments of the present invention are applied to a so-called liquid crystal television including a liquid crystal display panel will be described in detail as an example, with reference to the accompanying drawings.

Embodiment 1

Figure 1:
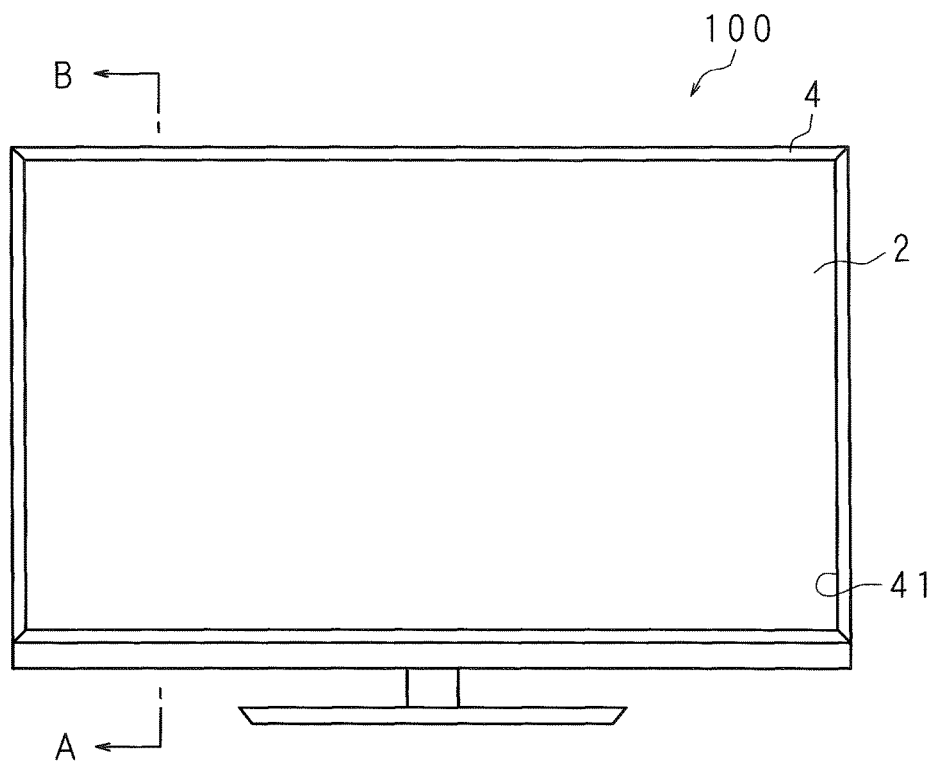
FIG. 1 is a front view illustrating an appearance of a liquid crystal television according to Embodiment 1 of the present invention.
Figure 2:
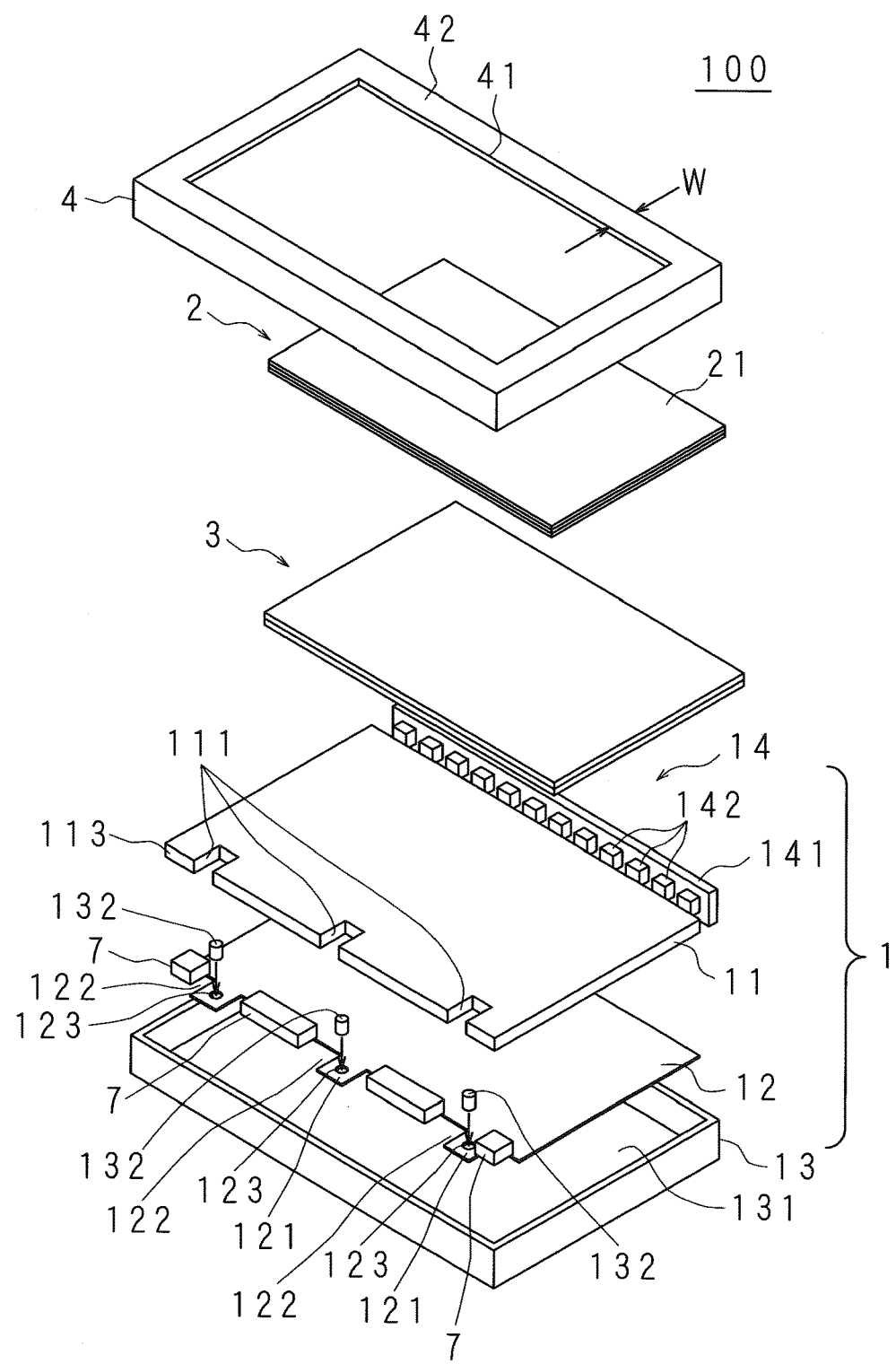
FIG. 2 is an exploded perspective view illustrating a configuration of main components of the liquid crystal television according to embodiments of the present invention.
Figure 3:
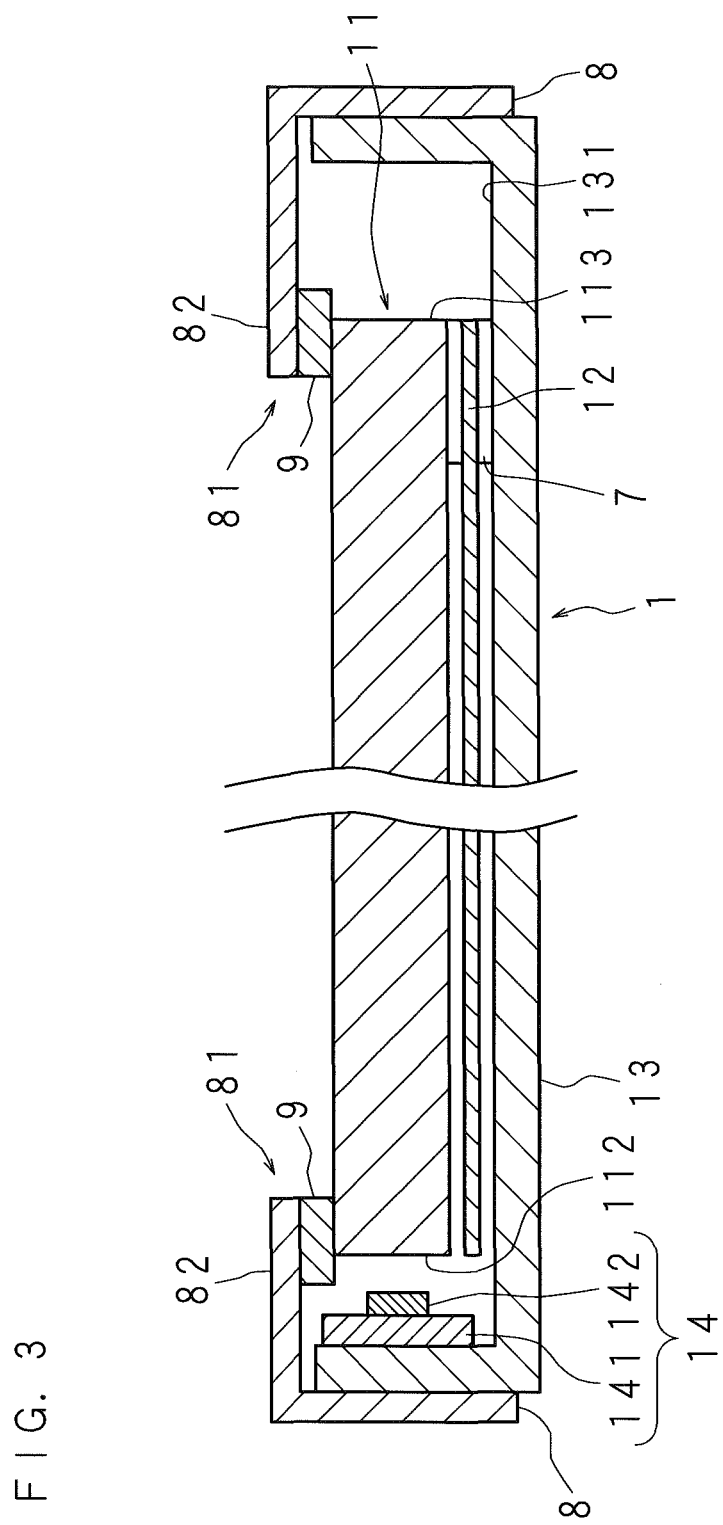
FIG. 3 is a longitudinal-sectional view taken on line A-B in FIG. 1.

FIG. 1 is a front view illustrating an appearance of a liquid crystal television according to Embodiment 1 of the present invention, FIG. 2 is an exploded perspective view illustrating a configuration of main components of the liquid crystal television according to embodiments of the present invention, and FIG. 3 is a longitudinal-sectional view taken along line A-B in FIG. 1. In the drawings, a liquid crystal television 100 according to the embodiments of the present invention is illustrated. Hereinafter, for the convenience of explanation, a horizontal direction and a vertical direction of the liquid crystal television are referred to as a lateral direction and a longitudinal direction, respectively.

The liquid crystal television 100 includes a light source device 1, a liquid crystal display panel 2, an optical sheet 3 and a front chassis 4 in which the liquid crystal display panel 2 and the optical sheet 3 are stored and the like.

Further, the light source device 1 includes a light source unit 14, a light guide plate 11 which guides light made incident thereon from the light source unit 14 to one surface thereof on the liquid crystal display panel 2 side, a reflection sheet 12 which reflects the light made incident from the light source unit 14 toward the one surface of the light guide plate 11, and a backlight chassis 13 in which the light source unit 14, the light guide plate 11 and the reflection sheet 12 are stored.

The front chassis 4 is disposed on a front side from the liquid crystal display panel 2 on which an image is displayed. The front chassis 4 is formed in a cylindrical shape having a rectangular bottom copying the shape of one surface 21 of the liquid crystal display panel 2 viewed from a user, and has a rectangular display window 41 opened in the bottom thereof. The user may view the image displayed on the one surface 21 of the liquid crystal display panel 2 through the display window 41.

Portions between edges of the bottom of the front chassis 4 and edges of the display window 41 have a prescribed width W. In other words, in the bottom of the front chassis 4, residual portions other than the display window 41 are formed as a hollow rectangular frame part 42.

Peripheral edge parts of the one surface 21 of the liquid crystal display panel 2 are covered with the frame part 42, and the optical sheet 3 is provided on the other surface side of the liquid crystal display panel 2, so that one surface of the optical sheet 3 is disposed to face the other surface of the liquid crystal display panel 2.

The liquid crystal display panel 2 is an active matrix type, for example, and includes a transparent substrate on the one surface 21 side and a transparent substrate on the other surface side, which are disposed to face each other at a prescribed gap. Liquid crystal is sealed in the gap between these transparent substrates. A polarizing plate (not illustrated) is provided between the transparent substrate on the other surface side and the optical sheet 3.

The light guide plate 11 of the light source device 1 is provided on the other surface side of the optical sheet 3, and the one surface of the light guide plate 11 is disposed so as to face the other surface of the optical sheet 3.

The optical sheet 3 is a publicly known sheet which functions to diffuse and collect, etc. light emitted from the light source unit 14 and made incident thereon through the light guide plate 11, so as to more uniformly emit the light toward the liquid crystal display panel 2. For example, the optical sheet 3 includes two diffusion sheets, and one prism sheet, wherein the prism sheet is installed between the two diffusion sheets.

One diffusion sheet of the two diffusion sheets, which is disposed on the light guide plate 11 side, is an optical sheet which functions to diffuse the light made incident thereon from the light source unit 14 through the light guide plate 11 and allow it to be made incident on the prism sheet. In addition, the prism sheet is an optical sheet which functions to collect the light made incident thereon through the one diffusion sheet and emit it toward the other diffusion sheet. The light passing through the prism sheet is made incident on the other diffusion sheet perpendicular to the prism sheet.

The other diffusion sheet disposed on the liquid crystal display panel 2 side is an optical sheet which functions to again diffuse the light made incident thereon through the prism sheet and emit it toward the liquid crystal display panel 2 with a more uniform luminance distribution.

The light source device 1 is a so-called edge light type, and includes the light source unit 14, the light guide plate 11 disposed on the other surface side of the optical sheet 3, and the reflection sheet 12 provided on the other surface side light guide plate 11. The reflection sheet 12 is disposed so that one surface thereof faces the other surface of the light guide plate 11, and the light guide plate 11 and the reflection sheet 12 are stored in the backlight chassis 13 with being stacked.

The light guide plate 11 is made of a high transparency rectangular acrylic resin, for example, has a prescribed thickness, and guides the light emitted by light source unit 14 near one side surface thereof to the optical sheet 3 (liquid crystal display panel 2). For example, the light guide plate 11 may be configured in such a manner that one surface thereof facing the other surface of the optical sheet 3 has a light emitting surface on which a pattern is formed so that the light made incident thereon from the light source unit 14 advances in the liquid crystal display panel 2 direction. Thereby, the light guide plate 11 may convert the light made incident thereon from the light source unit 14 into flat light to uniformly transmit it to the optical sheet 3 through the light emitting surface. Further, the reflection sheet 12 is provided on the other surface side of the light guide plate 11.

In addition, the light guide plate 11 has notches 111, 111 and 111 formed at three places of one edge part on a long-side thereof. The notches 111, 111 and 111 are provided at positions matching with hanging pin members 132, 132 and 132 disposed at three places of the backlight chassis 13 to be described below. For example, the notches 111, 111 and 111 are formed at an edge part of the other side surface opposite to the one side surface of the light guide plate 11 at equal intervals. Hereinafter, the one side surface near to the light source unit 14 is referred to as a proximal light side surface 112, and the other side surface far from the light source unit 14 is referred to as a distal light side surface 113. For example, the notches 111, 111 and 111 are formed in a U shape in a thickness direction of the light guide plate 11.

Herein, mirror-finishing is executed on each side surface of four sides of a light guide plate 11 except for the side surface relating to the notch 111, and a part of the light made incident from the light source unit 14 freely passes through the side surface to an outside. Meanwhile, the side surface relating to the notch 111 is not executed the mirror finishing, and a part of the light made incident from the light source unit 14 causes irregular reflection on the side surface relating to the notch 111.

The other surface side of the liquid crystal display panel 2 is, as illustrated in FIG. 3, provided with light guide plate holding frame 8 to hold by pressing the light guide plate 11. The light guide plate holding frame 8 is formed in a cylindrical shape having a rectangular bottom copying the shape of the bottom of the front cover 4, and is formed in an L shape in a cross-sectional view. In addition, the light guide plate holding frame 8 has a rectangular opening 81 copying the display window 41, which is formed in the bottom of the light guide plate holding frame 8.

The light guide plate holding frame 8 presses a peripheral edge part of the light guide plate 11 to the reflection sheet 12 side through spacer frame 9 made of an elastic member to prevent damage to the light guide plate 11. That is, the spacer frame 9 is formed in a hollow rectangular shape, and contacts with the peripheral edge part of the one surface of the light guide plate 11. Briefly, in the bottom of the light guide plate holding frame 8, the residual portion 82 other than the opening 81 is formed in a hollow rectangular shape, and the light guide plate holding frame 8 applies a pressing force to the spacer frame 9 toward the light guide plate 11, while inner edge part of the residual portion 82 abuts the spacer frame 9. Thereby, the light guide plate 11 is held by spacers 7 to be described below and the light guide plate holding frame 8. The spacer frame 9 may be, for example, made of a high-density micro-cell urethane foam, rubber or elastomer.

Meanwhile, the reflection sheet 12 is formed in a rectangular shape having substantially the same dimensions as the light guide plate 11, and irregularly reflects the light made incident on the light guide plate 11 from the light source unit 14 by the other surface side of the light guide plate 11 to emit it through the light emitting surface of the light guide plate 11.

The reflection sheet 12 is formed so that an edge part on one long-side thereof, which is disposed near the distal light side surface 113 of the light guide plate 11, has concaves and convexes. In particular, three convex parts 121, 121 and 121, and four concave parts 122, 122, 122 and 122 are formed, and the three convex parts 121, 121 and 121 are formed at the edge part at equal intervals. The concave part 122 is, for example, formed in a U shape and the convex part 121 has a rectangular shape, in the thickness direction of the reflection sheet 12

In addition, through holes 123 penetrating the reflection sheet 12 in the thickness direction thereof are formed in a central part of each convex part 121. The through hole 123 is a circular shape having a diameter substantially the same as an outer diameter of the hanging pin member 132, and the hanging pin member 132 is inserted into the through hole 123, and thereby the reflection sheet 12 is suspended.

Figure 4:
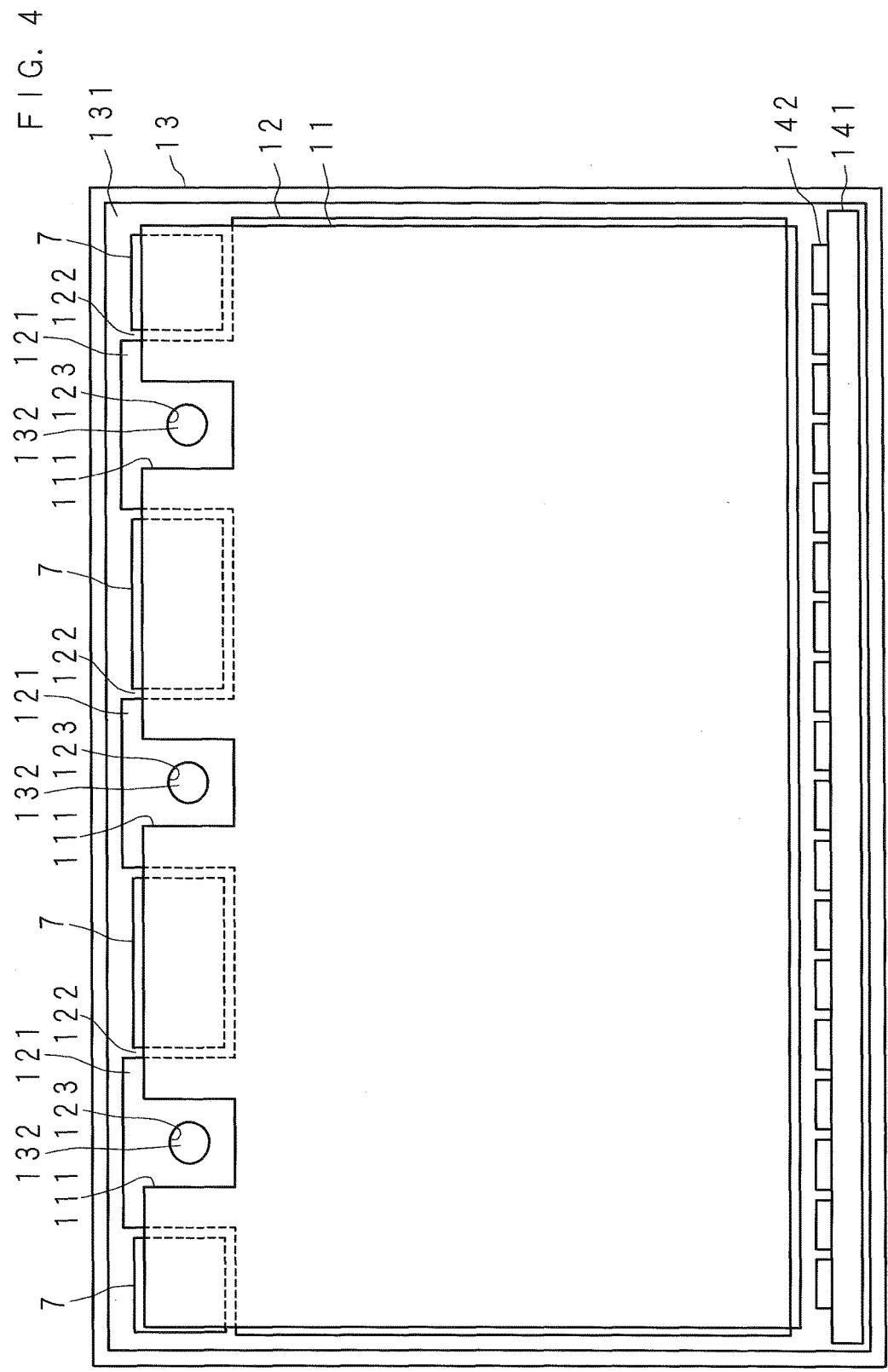
FIG. 4 is an explanatory view schematically illustrating a case in which a light guide plate and a reflection sheet are stored in a backlight chassis of the liquid crystal television according to Embodiment 1 of the present invention.

FIG. 4 is an explanatory view schematically illustrating a case in which the light guide plate 11 and the reflection sheet 12 are stored in the backlight chassis 13 of the liquid crystal television 100 according to Embodiment 1 of the present invention.

The light guide plate 11 and the reflection sheet 12 are configured in such a manner that, when they are stored in the backlight chassis 13, the position between the through holes 123, 123 and 123 and the notches 111, 111 and 111 match with each other, in a stacking direction in which these are stacked. The reflection sheet 12 is slightly larger than the light guide plate 11.

The spacers 7 are provided in each concave part 122 of the reflection sheet 12 on the bottom 131 of the backlight chassis 13, so as to constantly maintain an interval between the light guide plate 11, and the reflection sheet 12 or the bottom 131 of the backlight chassis 13. The spacers 7 are disposed so as to be the same interval with the convex parts 121 on both sides thereof, in a direction in which the concave parts 122, 122, 122 and 122 are juxtaposed. Further, the spacer 7 has, for example, a rectangular shape, and has a dimension in the stacking direction drastically greater than the thickness of the reflection sheet 12. The spacer 7 is made of foamed PET, rubber, or the like and has a prescribed elasticity.

When the light guide plate 11 is stored in the backlight chassis 13, the spacers 7 are configured to abut the edge part on the distal light side surface 113 side of the light guide plate 11 (see FIG. 3). That is, the spacers 7 are installed between the edge part on the distal light side surface 113 side of the light guide plate 11 and the bottom 131 of the backlight chassis 13. Therefore, as described above, the light guide plate holding frame 8 applies the pressing force to the spacer frame 9 toward the light guide plate 11, and thereby, the light guide plate 11 is held by spacers 7 and the light guide plate holding frame 8. The spacer 7 has a prescribed elasticity, as described above, such that it is possible to hold the light guide plate 11 by compressing.

Herein, the spacer 7 has a low friction coefficient. For example, the spacer 7 has a friction coefficient of the friction coefficient of PET or less, and preferably, has a lower friction coefficient than the friction coefficient of a material of the light guide plate 11. Thereby, since the spacer 7 has a low friction coefficient, the light guide plate 11 can slide even in a state of being held by the spacer 7 and the light guide plate holding frame 8.

The light source unit 14 is provided on a lower side surface of both long-sides of the light guide plate 11, that is, in the vicinity of the proximal light side surface 112. The light source unit 14 has a substrate 141 disposed to face the proximal light side surface 112 of the light guide plate 11, a plurality of light sources 142, 142, . . . , and 142 which are mounted on the substrate 141 and juxtaposed along the proximal light side surface 112 of the light guide plate 11. The light sources 142, 142, . . . , and 142 may be, for example, a light emitting diode (LED), cold cathode fluorescent lamp (CCFL), hot cathode fluorescent lamp (HCFL), external electrode fluorescent lamp (EEFL) or the like.

In the present invention, the light source unit 14 is not limited to the above-described configuration. For example, it may be configured such that the light source unit 14 is provided at both side surface sides of both short-sides of the light guide plate 11 or any one side surface thereof, and may be configured to be provided on both side surface sides of both short-sides of the light guide plate 11 and the proximal light side surface 112.

The backlight chassis 13 is formed in a cylindrical shape having the rectangular bottom 131 copying the shape of the reflection sheet 12, and the circular column-shaped hanging pin members 132, 132 and 132 for suspending the reflection sheet 12 protrude on an upper long-side of the bottom 131 in the longitudinal direction matching with the positions of each through hole 123 of the reflection sheet 12.

In addition, in the present invention, the position of the light guide plate 11 is determined by the hanging pin members 132 in the backlight chassis 13. That is, the hanging pin members 132 also serve as a role of a so-called positioning part, and during the light guide plate 11 is stored into the backlight chassis 13, the notches 111, 111 and 111 of the light guide plate 11 may be engaged with the hanging pin members 132, 132 and 132.

Further, as described above, the through hole 123 of each convex part 121 is fitted to an outer circumference of the hanging pin member 132, such that the position of the reflection sheet 12 in the backlight chassis 13 is determined. By the above-described configuration, in the present invention, a position shift of the light guide plate 11 and the reflection sheet 12 may be prevented.

Due to having the above-described configuration, in the liquid crystal television 100 according to Embodiment 1 of the present invention, it is possible to narrow the width W of the frame part 42 by extending the display window 41, and extend an area of the image display region in the liquid crystal display panel 2 (one surface 21), which will be described in detail below with reference to FIG. 4.

In the display apparatus having the structure for suspending the light guide plate 11 or the reflection sheet 12, as the liquid crystal television 100 of the present invention, a hanging mechanism for the suspending, that is, the convex part 121 and the hanging pin member 132 in the present invention are required.

Accordingly, in the above-described structure, it is difficult to provide the light guide plate 11 by extending the same to the hanging pin member 132, while, when extending the display window 41 by narrowing the width W of the frame part 42 without extending the light guide plate 11 to the hanging pin member 132, due to the presence of the concave part 122, the hanging pin member 132, and the like, a problem (luminance unevenness) occur in the image display region of the liquid crystal display panel 2 (one surface 21), and thereby provides an abnormal feeling to the user.

However, in the liquid crystal television 100 according to Embodiment 1 of the present invention, the notches 111, 111 and 111 are provided in the light guide plate 11, and the hanging pin members 132, 132 and 132 are engaged to the notches 111, 111 and 111, such that the light guide plate 11 is provided by extending the same. Each notch 111 of the light guide plate 11 is located in matching with the convex part 121 of the reflection sheet 12 in the stacking direction. Further, in the stacking direction, a region defined by the notch 111 is configured so as to be settled in the convex part 121 of the reflection sheet 12.

Accordingly, it is possible to reflect the light irregularly reflected by a portion along the side surface of the notch 111, and the light reflected by the hanging pin member 132 to the liquid crystal display panel 2 side by the convex part 121 of the reflection sheet 12. In addition, most of the residual portions other than the notches 111, 111 and 111 in an edge part on the distal light side surface 113 side of the light guide plate 11 are disposed to face the concave parts 122 of the reflection sheet 12, and the reflection of light to the liquid crystal display panel 2 is suppressed at the residual portions.

That is, the luminance in the notches 111 in which the light guide plate 11 is absent is increased, and the luminance in the residual portions in which the light guide plate 11 is present is decreased by removing the reflection sheet 12, such that it is possible to prevent an occurrence of unevenness in the edge part on the distal light side surface 113 side of the light guide plate 11.

Thereby, in the liquid crystal television 100 according to the present invention, it is possible to narrow the width W of the frame part 42, and provide a wider image display region to the user.

In addition, in the liquid crystal television 100 according to Embodiment 1 of the present invention, as described above, the spacer 7 has a low friction coefficient, and the light guide plate 11 is configured to slide with being held by the spacers 7 and the light guide plate holding frame 8. Therefore, the light guide plate 11 may be extended or contracted according to an increase or a decrease in a temperature during using the liquid crystal television 100.

Further, in the liquid crystal television 100 according to Embodiment 1 of the present invention, the spacers 7 are installed between the edge part on the distal light side surface 113 side of the light guide plate 11 and the bottom 131 of the backlight chassis 13. Accordingly, the reflection sheet 12 may be extended or contracted according to an increase or a decrease in a temperature during using the liquid crystal television 100, without the reflection sheet 12 being brought into abutment or pressure-contact with the light guide plate 11 at the edge part near the distal light side surface 113 of the light guide plate 11, and an occurrence of a deflection in the reflection sheet 12 may be prevented.

Furthermore, in the above description, the case in which the liquid crystal television 100 of the present invention has a structure for suspending the light guide plate 11 or the reflection sheet 12, and in order to suspend these components, the hanging mechanism including the convex part 121 and the hanging pin member 132 is required as an example. However, the present invention is not limited thereto, and it may be configured not to have such a hanging mechanism.

For example, it may be configured in such a manner that, in the reflection sheet 12 of the liquid crystal television 100, the edge parts on both short-sides corresponding to both side surfaces adjacent to the distal light side surface 113 of the light guide plate 11 have the concaves and convexes, and positioning parts are disposed at the edge parts of the reflection sheet 12. In this case, the light guide plate 11 may be configured to have the notch 111 at a position corresponding to the convex part of the edge part of the reflection sheet 12, and the spacer 7 is located in the concave part of the edge part of the reflection sheet 12.

Embodiment 2

In Embodiment 1, the case in which the convex parts 121, 121 and 121 and the concave parts 122, 122, 122 and 122 are formed at equal intervals, and each spacer 7 is disposed so as to be the same interval formed between the spacer 7 and each of the convex part 121 on both sides of the spacer 7 (hereinafter, simply referred to as an interval between the convex part 121 and the spacer 7), in the direction in which the concave parts 122, 122, 122 and 122 are juxtaposed has been described as an example, but the present invention is not limited thereto.

Figure 5:
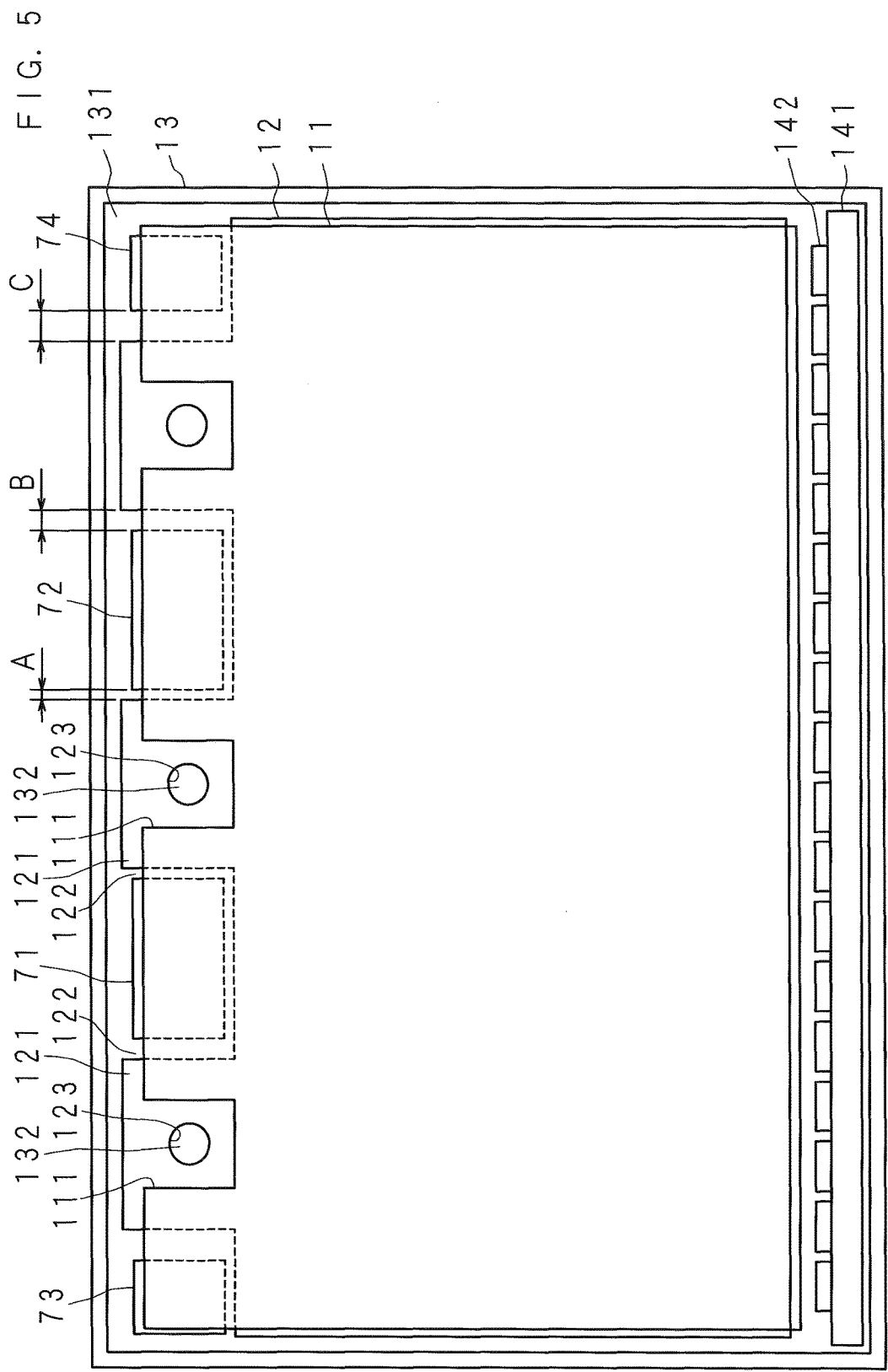
FIG. 5 is an explanatory view schematically illustrating a case in which the light guide plate and the reflection sheet are stored in the backlight chassis of a liquid crystal television according to Embodiment 2 of the present invention.

FIG. 5 is an explanatory view schematically illustrating a case in which the light guide plate 11 and the reflection sheet 12 are stored in the backlight chassis 13 of a liquid crystal television 100 according to Embodiment 2 of the present invention. As illustrated in FIG. 5, in the liquid crystal television 100 according to Embodiment 2 of the present invention, the intervals between the convex parts 121 and the spacers 7 are different from each other in the direction in which the concave parts 122, 122, 122 and 122 are juxtaposed.

In the liquid crystal television 100 according to Embodiment 2 of the present invention, the intervals between the convex parts 121 and the spacers 7 are configured to be increased toward an end part of the reflection sheet 12 in a juxtaposed direction in which the concave parts 122, 122, 122 and 122 are juxtaposed.

As illustrated in FIG. 5, in the juxtaposed direction, in other words, in the lateral direction of the liquid crystal television 100, a spacer 71 and a spacer 72 are respectively disposed between a convex part 121 of the central part (hereinafter, referred to as a central convex part 121) and convex parts 121 on left and right of the central convex part 121 in the drawing (hereinafter, respectively referred to as a left convex part 121 and a right convex part 121), and a spacer 73 and a spacer 74 are also respectively disposed at further left from the left convex part 121 and at further right from the right convex part 121.

However, an interval A between the central convex part 121 and the spacer 72, an interval B between the spacer 72 and the right convex part 121, and an interval C between the right convex part 121 and the spacer 74 are different from each other, and they have a relationship of interval A<interval B<interval C.

During the reflection sheet 12 is extended or contracted due to thermal expanding, when the central part thereof in an extension and contraction direction is held, extension and contraction amounts are increased toward the end part of the reflection sheet 12. Compared to this, in the liquid crystal television 100 according to Embodiment 2 of the present invention, as described above, it is configured so as to have a relationship of interval A<interval B<interval C, and the extension and contraction amounts are increased with becoming closer to the end parts in the extension and contraction direction, such that a problem such as an occurrence of a deflection in the reflection sheet 12 may be prevented due to abutting with the spacers 71, 72, 73 and 74.

The interval between the spacer 71, and the central convex part 121 and the left convex part 121, and the interval between the left convex part 121 and the spacer 73 are the same as described above, and will not be described in detail.

The same parts as those in Embodiment 1 will be denoted by the same reference numerals, and will not be described in detail.

Embodiment 3

In Embodiment 1, the case in which the spacer 7 has a low friction coefficient, and has a prescribed elasticity has been described as an example, but the present invention is not limited thereto.

Figure 6:
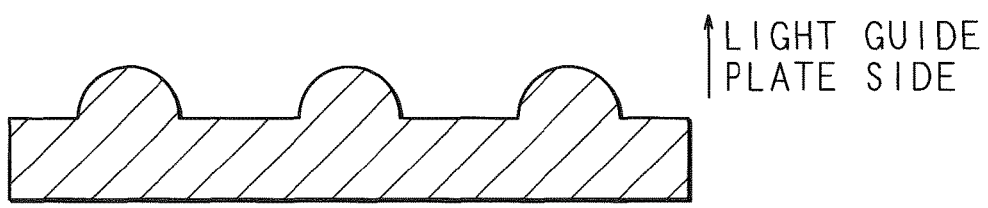
FIG. 6 is a longitudinal-sectional view schematically illustrating a shape of a spacer in a liquid crystal television according to Embodiment 3 of the present invention.

FIG. 6 is a longitudinal-sectional view schematically illustrating a shape of a spacer 7 in a liquid crystal television 100 according to Embodiment 3 of the present invention.

In the liquid crystal television 100 according to Embodiment 3 of the present invention, the spacer 7 (see FIG. 3) is configured so as to abut the edge part on the distal light side surface 113 side of the light guide plate 11, and has the same configuration as the spacer 7 according to Embodiment 1. Further, the spacer 7 has a contact surface with the light guide plate 11, which is configured so as to be uneven.

In the liquid crystal television 100 according to Embodiment 3 of the present invention, due to having the above described configuration, it is possible to reduce the contact area (friction) between the spacer 7 and the light guide plate 11, and, the light guide plate 11 may be more freely extended or contracted according to an increase or a decrease in a temperature during using the liquid crystal television 100.

The same parts as those in Embodiment 1 will be denoted by the same reference numerals, and will not be described in detail.

Embodiment 4

In Embodiment 1, the case in which the spacer 7 has a low friction coefficient, and has a prescribed elasticity has been described as an example, but the present invention is not limited thereto.

In the liquid crystal television 100 according to Embodiment 4 of the present invention, the spacer 7 has the same configuration as the spacer 7 according to Embodiment 1, and further, is configured so as to be in line contact or point contact with respect to the light guide plate 11.

That is, the spacer 7 and the light guide plate 11 are in line contact or point contact with each other, such that a contact area between the light guide plate 11 and the spacer 7 is reduced. Therefore, a structure in which the light guide plate 11 can slide during the light guide plate 11 is thermally expanded or contracted, that is, a structure in which the extension and contraction of the light guide plate 11 are not regulated may be achieved.

Thereby, the thermal expansion and contraction of the light guide plate 11 may be performed without being obstructed, and warping of the light guide plate 11 may be suppressed, to maintain good display quality.

The same parts as those in Embodiment 1 will be denoted by the same reference numerals, and will not be described in detail.

Embodiment 5

In Embodiment 1, the case in which the spacer 7 has a low friction coefficient, and has a prescribed elasticity has been described as an example, but the present invention is not limited thereto.

In the liquid crystal television 100 according to Embodiment 5 of the present invention, the spacer 7 has the same configuration as the spacer 7 according to Embodiment 1, and further, it is a configuration in which a contact surface with the light guide plate 11 is applied with a color of a white-based color.

That is, since most of the residual portions other than the notches 111, 111 and 111 are disposed to face the spacers 7 of the concave parts 122 of the reflection sheet 12, the surfaces of the spacers 7, at least the contact surface with the light guide plate 11 is formed with a white-based color to increase reflectance in the spacer 7, such that the reflectance around the notches 111, 111 and 111 is increased, and bright portion unevenness in the notches 111, 111 and 111 is alleviated.

Thereby, it is possible to suppress display unevenness due to irregular reflection in the notches 111, 111 and 111 of the light guide plate 11, to maintain good display quality.

The same parts as those in Embodiment 1 will be denoted by the same reference numerals, and will not be described in detail.

Embodiment 6

In Embodiment 1, the case in which the spacer 7 has a low friction coefficient, and has a prescribed elasticity has been described as an example, but the present invention is not limited thereto.

In the liquid crystal television 100 according to Embodiment 6 of the present invention, the spacer 7 has the same configuration as the spacer 7 according to Embodiment 1, and further, is configured so that a portion relating to the contact surface with the light guide plate 11 is made of a resin.

Thereby, the structure in which the light guide plate 11 can slide with respect to the extension and contraction direction during the light guide plate 11 is thermally expanded or contracted may be easily manufactured. For example, the elasticity of the resin itself may be changed, and in addition thereto, ruggedness processing, low friction coefficient processing, or the like may be easily executed on the contact surface of the spacer 7. Accordingly, the thermal expansion and contraction of the light guide plate 11 may be performed without being obstructed, and warping of the light guide plate 11 may be suppressed, to maintain good display quality.

The same parts as those in Embodiment 1 will be denoted by the same reference numerals, and will not be described in detail.

Embodiment 7

In Embodiment 1, the case in which the spacer 7 has a low friction coefficient, and has a prescribed elasticity has been described as an example, but the present invention is not limited thereto.

In the liquid crystal television 100 according to Embodiment 7 of the present invention, the spacer 7 has the same configuration as the spacer 7 according to Embodiment 1, and further, is configured so that the portion relating to the contact surface with the light guide plate 11 is made of metal or a metal compound.

That is, the surface of the spacer 7, at least the contact surface with the light guide plate 11 is made of metal or a metal compound to impart metallic luster, and increase the reflectance in the spacer 7, such that the reflectance around the notches 111, 111 and 111 is increased, and the bright portion unevenness in the notches 111, 111 and 111 is alleviated.

Thereby, it is possible to suppress display unevenness due to irregular reflection in the notches 111, 111 and 111 of the light guide plate 11, to maintain good display quality. Further, it is also possible to impart a strength for holding the light guide plate 11 to the spacer 7.

The same parts as those in Embodiment 1 will be denoted by the same reference numerals, and will not be described in detail.

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A light source device comprising:
   a reflection sheet suspended by protrusions which penetrate plural places of an outer peripheral edge part of the reflection sheet; and
   a light guide plate disposed to face the reflection sheet, wherein
   the light guide plate has notches formed in an edge part corresponding to the outer peripheral edge part of the reflection sheet, and at positions corresponding to the protrusions,
   the outer peripheral edge part of the reflection sheet has concave parts and convex parts, and the convex parts of the outer peripheral edge part are penetrated by the protrusions,
   the concave parts of the outer peripheral edge part are provided with spacers to constantly maintain an interval between the light guide plate and the reflection sheet,
   the spacer has a contact surface being uneven which contacts with the light guide plate and has a friction coefficient lower than that of the light guide plate, and
   an interval between each convex part and each spacer in a juxtaposed direction in which the convex parts are juxtaposed is increased as a position of the interval between each convex part and each spacer gets closer to an end part of the reflection sheet in the juxtaposed direction.

2. The light source device according to claim 1, wherein, in a direction in which the light guide plate and the reflection sheet face each other, regions relating to the notches of the light guide plate are settled in the convex parts.

3. A light source device comprising:
   a reflection sheet having concave parts and convex parts at plural places of an outer peripheral edge part; and
   a light guide plate disposed to face the reflection sheet, wherein
   the light guide plate has notches in an edge part corresponding to the outer peripheral edge part of the reflection sheet, and at positions corresponding to the convex parts,
   the concave parts of the outer peripheral edge part are provided with spacers to constantly maintain an interval between the light guide plate and the reflection sheet,
   the spacer has a contact surface being uneven which contacts with the light guide plate and has a friction coefficient lower than that of the light guide plate, and
   an interval between each convex part and each spacer in a juxtaposed direction in which the convex parts are juxtaposed is increased as a position of the interval between each convex part and each spacer gets closer to an end part of the reflection sheet in the juxtaposed direction.

4. The light source device according to claim 1, wherein the spacer is in pressure-contact with an edge part of the light guide plate, and
the light guide plate is configured to slide.

5. The light source device according to claim 1, wherein the spacer has elasticity.

6. The light source device according to claim 1, wherein the spacer is in line contact or point contact with respect to the light guide plate.

7. The light source device according to claim 1, wherein the spacer has a contact surface with the light guide plate, which has a color of a white-based color.

8. The light source device according to claim 1, wherein the spacer has a contact surface with the light guide plate, which is made of a resin.

9. The light source device according to claim 1, wherein the spacer has a contact surface with the light guide plate, which is made of metal or a metal compound.

10. The light source device according to claim 1, comprising:
    a light source configured to emit light to be made incident on the light guide plate,
    wherein the concave parts are provided at an edge part away from the light source.

11. The light source device according to claim 3, wherein, in a direction in which the light guide plate and the reflection sheet face each other, regions relating to the notches of the light guide plate are settled in the convex parts.

12. The light source device according to claim 11, wherein the spacer is in pressure-contact with an edge part of the light guide plate, and
the light guide plate is configured to slide.

13. The light source device according to claim 11, wherein the spacer has elasticity.

14. The light source device according to claim 11, wherein the spacer is in line contact or point contact with respect to the light guide plate.

15. The light source device according to claim 11, wherein the spacer has a contact surface with the light guide plate, which has a color of a white-based color.

16. The light source device according to claim 11, wherein the spacer has a contact surface with the light guide plate, which is made of a resin.

17. The light source device according to claim 11, wherein the spacer has a contact surface with the light guide plate, which is made of metal or a metal compound.

18. The light source device according to claim 11, comprising:
    a light source configured to emit light to be made incident on the light guide plate,
    wherein the concave parts are provided at an edge part away from the light source.

19. A display apparatus comprising:
    the light source device according to claim 1; and
    a display panel which is provided on one surface side of the light guide plate, and displays an image thereon using light made incident thereon through the light guide plate.

20. A display apparatus comprising:
    the light source device according to claim 11; and
    a display panel which is provided on one surface side of the light guide plate, and displays an image thereon using light made incident thereon through the light guide plate.

* * * * *